United States Patent
Alexander et al.

(10) Patent No.: US 8,892,952 B2
(45) Date of Patent: Nov. 18, 2014

(54) PRESERVE STATUS PARAMETER FOR TESTING IN COMPUTING SYSTEM

(75) Inventors: Eugenie L. Alexander, Spokane, WA (US); Arthur J. Bariska, Jr., Tucson, AZ (US); Matthew T. Cousens, Catskill, NY (US); Eileen S. Kovalchick, Tucson, AZ (US); Joel L. Masser, San Jose, CA (US); Kevin D. McKenzie, Poughkeepsie, NY (US); Eileen P. Tedesco, Sharon, CT (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/447,683

(22) Filed: Apr. 16, 2012

(65) Prior Publication Data
US 2013/0275809 A1    Oct. 17, 2013

(51) Int. Cl.
*G06F 11/00* (2006.01)
(52) U.S. Cl.
USPC .......... 714/38.1; 714/38.11; 717/124
(58) Field of Classification Search
CPC ............ G06F 11/3664; G06F 11/3668; G06F 11/3672; G06F 11/3636
USPC .......... 714/38.1, 38.11; 717/124–130
See application file for complete search history.

(56) References Cited

U.S. PATENT DOCUMENTS

| 5,619,644 A | 4/1997 | Crockett et al. | |
| 6,618,851 B1 * | 9/2003 | Zundel et al. | 717/103 |
| 6,671,826 B1 * | 12/2003 | Joshi et al. | 714/38.11 |
| 7,069,470 B2 * | 6/2006 | Wilding et al. | 714/34 |
| 7,376,864 B1 * | 5/2008 | Hu et al. | 714/6.13 |
| 7,447,544 B1 | 11/2008 | Kroll | |
| 7,756,573 B2 | 7/2010 | Shen et al. | |
| 2002/0165952 A1 | 11/2002 | Sewell et al. | |
| 2005/0203682 A1 | 9/2005 | Omino et al. | |
| 2007/0074065 A1 * | 3/2007 | Suzuki | 714/5 |
| 2013/0275809 A1 * | 10/2013 | Alexander et al. | 714/32 |

OTHER PUBLICATIONS

J. Stockenberg, et al., "Vertical Migration for Performance Enhancement in Layered Hardware/Firmware/Software Systems," IEEE (via SPI); IP.com No. IPCOM000131305D; Original Publication Date: May 1, 1978; IEEE Computer vol. 11 No. 5, pp. 35-49; IP.com Electronic Publication: Nov. 10, 2005.

P. Rogers, et al., "z/Os Diagnostic Data Collection and Anaylsis," IBM Redbooks; Aug. 2005; pp. 1-260.

* cited by examiner

*Primary Examiner* — Philip Guyton
(74) *Attorney, Agent, or Firm* — Cantor Colburn LLP; William A. Kinnaman, Jr.

(57) ABSTRACT

A method for testing using a preserve status parameter in a computing system includes setting, by a calling process in the computing system, the preserve status parameter; issuing a call to a function under test by the calling process in the computing system; executing the function under test in the computing system, wherein data in a memory area accessed by the function under test during execution is preserved by the set preserve status parameter, such that the computing system does not reuse the memory area while the data in the memory area is being preserved; determining if an error occurred during execution of the function under test; in the event an error is determined to have occurred during execution of the function under test, making the data in the memory area available for inspection; and releasing the memory area for reuse by the computing system.

25 Claims, 3 Drawing Sheets

PRESERVE STATUS PARAMETER FOR TESTING IN COMPUTING SYSTEM

BACKGROUND

This disclosure relates generally to the field of testing in a computing system, and more particularly to a preserve status parameter for use in testing in a computing system.

At various stages during the life cycle of a computing system, such as development or deployment in the field, various software or hardware components of the computing system may exhibit problems such as bugs or other unusual behaviors. In the process of fixing problems in the computing system, testing may be performed that includes attempts to recreate the problem in order to learn more about the problem. As the problem is recreated, error information regarding the state of the computer during the recreation of the problem, such as trace data, storage dumps, or state saves, may be stored for inspection. However, the stored error information may give an incomplete picture of the state of the computing system surrounding the problem. For example, storage dumps and state saves merely provide a snapshot of the state of the computing system at the time the dump or state save was taken, and may not provide a complete picture of data that is relevant to the problem depending on when the problem occurred relative to the storage dump or state save. Further, storage of error information in a computing system may require a large amount of memory. For example, trace data may be generated by the computing system at a high volume such that the trace data wraps, overwriting earlier trace data and rendering it unavailable for inspection. Therefore, by the time an error is detected, trace data pertinent to diagnosis of the error may be overwritten, causing loss of the trace data.

BRIEF SUMMARY

In one aspect, a method for testing using a preserve status parameter in a computing system includes setting, by a calling process in the computing system, the preserve status parameter; issuing a call to a function under test by the calling process in the computing system; executing the function under test in the computing system, wherein data in a memory area accessed by the function under test during execution is preserved by the set preserve status parameter, such that the computing system does not reuse the memory area while the data in the memory area is being preserved; determining if an error occurred during execution of the function under test; in the event an error is determined to have occurred during execution of the function under test, making the data in the memory area available for inspection; and releasing the memory area for reuse by the computing system.

In another aspect, a computer program product comprising a computer readable storage medium containing computer code that, when executed by a computing system, implements a method for testing using a preserve status parameter, wherein the method includes setting, by a calling process in the computing system, the preserve status parameter; issuing a call to a function under test by the calling process in the computing system; executing the function under test in the computing system, wherein data in a memory area accessed by the function under test during execution is preserved by the set preserve status parameter, such that the computing system does not reuse the memory area while the data in the memory area is being preserved; determining if an error occurred during execution of the function under test; in the event an error is determined to have occurred during execution of the function under test, making the data in the memory area available for inspection; and releasing the memory area for reuse by the computing system.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
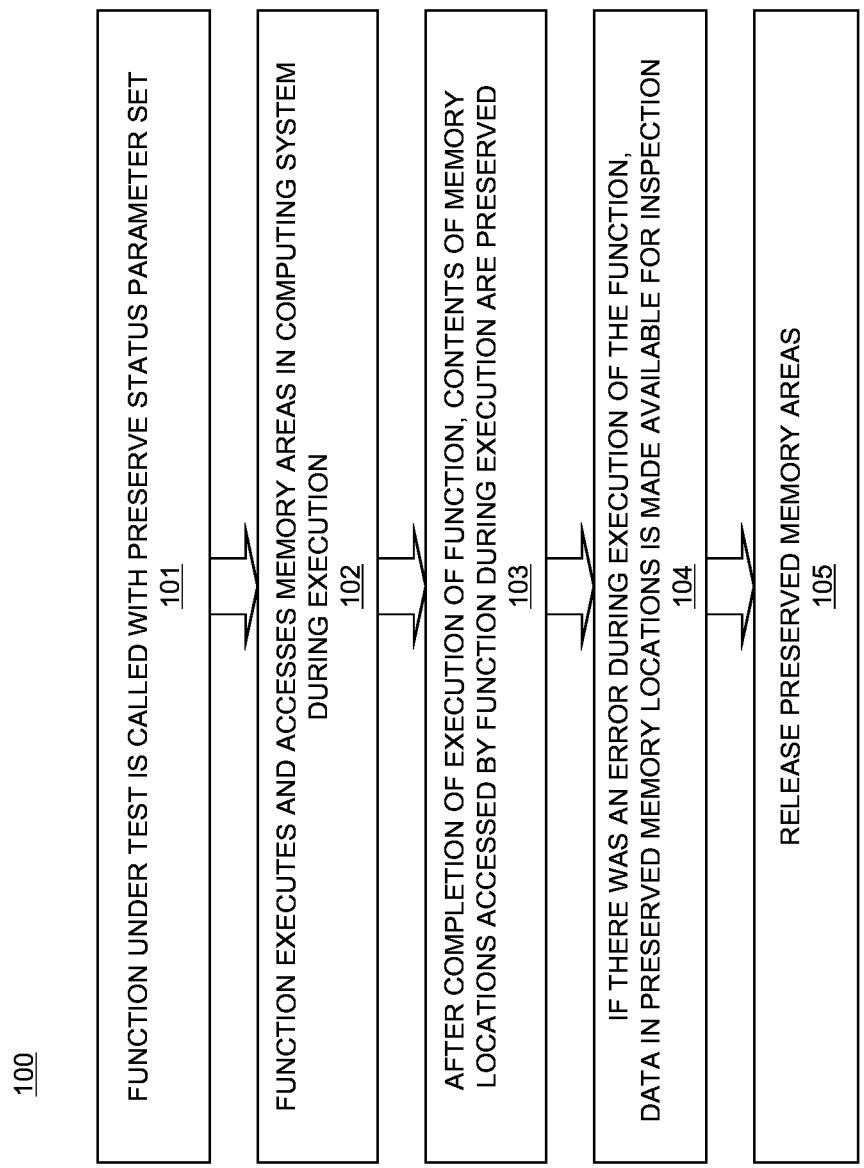
FIG. 1 illustrates a flowchart illustrating an embodiment of a method for testing in a computing system including a preserve status parameter.

Embodiments of a preserve status parameter for testing in a computing system, and a method for testing in a computing system including a preserve status parameter, are provided, with exemplary embodiments being discussed below in detail. By the time an error is detected in the execution of a function, storage areas in the computer memory that hold information that is pertinent for diagnosis of the error may be overwritten. The preserve status parameter specifies that the contents of computer memory areas that are accessed during execution of a function under test are to be preserved after completion of execution of the function for inspection in the event of an error. The preserve status parameter may be set at the time of a call to the function under test. The computer memory areas containing preserved data may then be released for reuse by the computing system after error-free completion of the function under test or, in the event of an error during execution of the function, after the preserved data has been made available for inspection. This expands the preservation window of data regarding the function under test, giving a more complete picture of the state of the computing system surrounding an error, while maintaining a relatively small footprint in the computer memory.

Setting of the preserve status parameter allows capturing of key data generated during execution of a function prior to detection of an error, so that the data may be inspected in the event of an error in the function. Testing including a preserve status parameter may be applied to testing and diagnosis of any type of function in a computing system, including both software and hardware products, on any platform, including vendor products. The preserve status parameter improves testability and serviceability in the computer system, reducing the need for multiple hit-or-miss problem recreation attempts, thus saving time and resources.

The computer memory areas that are preserved by setting of the preserve status parameter may include any locations in the computer memory that are accessed by a function under test, including but not limited to a control block, an internal request element, table information, a buffer, a buffer control block, a work unit block, a placeholder, and metadata. In the event of an error, a dump or state save of the preserved memory areas may be performed so that the information stored therein may be examined. The preserved memory areas are marked as unavailable for reuse by the computing system until a release command is issued. The release command may be issued manually after the dump or state save in some embodiments, or may be determined by a timer in other embodiments; for example, a cleanup program may run periodically to check for preserved areas that have been preserved for longer than a threshold preservation time, and release areas that have been preserved for greater than the threshold preservation time. In further embodiments, a second call to the function under test may act to release the preserved memory areas. A user-specified bias may also be included in the implementation of the preserve status parameter, indicating whether memory areas should continue to be preserved if there is a shortage of available memory in the computing system, or a shortage of a specific type of storage cell in the computing system. Setting and releasing of the preserve status parameter may be determined by, for example, a user such as a computer programmer or test engineer.

FIG. 1 illustrates a flowchart of an embodiment of a method 100 for testing in a computing system including a preserve status parameter. In block 101 of method 100, a computer program, i.e., a calling process, in a computing system calls a function under test with the preserve status parameter set. The preserve status parameter may comprise a single bit in some embodiments, and this bit may be set to, for example, "1"; in other embodiments, the preserve status parameter may comprise a string or Boolean that indicates, for example, "true" or "yes". The preserve status parameter may be set in any appropriate manner, depending on the computing system, the type of calling process, and the function being tested. In some embodiments, setting the preserve status parameter may be handled by the compiler, such that it is masked from the function under test. The preserve status parameter may be set with various options in some embodiments. For example, the preserve status parameter may be set with an option specifying particular data areas that are to be preserved; such an option may be used in a case in which preserving all the memory areas accessed by the function under test causes a significant change in timing of execution of the function, so that a known problem cannot be recreated.

Next, in block 102, the function under test executes, accessing various memory areas in the computing system during its execution. Then, in block 103, after completion of execution of the function, memory areas that were accessed by the function during execution are preserved, i.e., marked as unavailable for reuse by the computing system. The preserved memory areas may include any of, but are not limited to, a control block, an internal request element, table information, a buffer, a buffer control block, a work unit block, a placeholder, and metadata. In an embodiment in which particular data areas for preservation were specified in the setting of the preserve status parameter, only those specified areas will be preserved; in other embodiments, all memory areas that were accessed by the function under test may be preserved.

Flow then proceeds to block 104 where, if an error was detected during the execution of the function, the data in the preserved memory areas may be made available for inspection. In the event of an error, a dump or state save of the preserved memory areas may be performed, so that the information stored therein may be examined in order to gain additional information about the error. The data in the preserved memory areas gives a picture of the state of the computing system at or close to the time of the error.

Lastly, in block 105 of method 100, after either error-free execution of the function under test or making available for inspection of the preserved data, the calling process issues a release command for the preserved memory areas, freeing the preserved memory areas for reuse by the computing system. The release command may be issued in any appropriate manner. For example, the calling process may again call the function under test with a release status parameter set to true. A new request that reuses the same user parameter list as a preserve status call may cancel the preserve status requested by that parameter list in some embodiments. In other embodiments, a timer may determine when to release preserved memory areas. In further embodiments in which a user-specified bias is included in implementation of the preserve status parameter, the preserved memory areas may be released in the event of a shortage of available memory in the computing system, or a shortage of a specific type of storage cell in the computing system.

Figure 2:
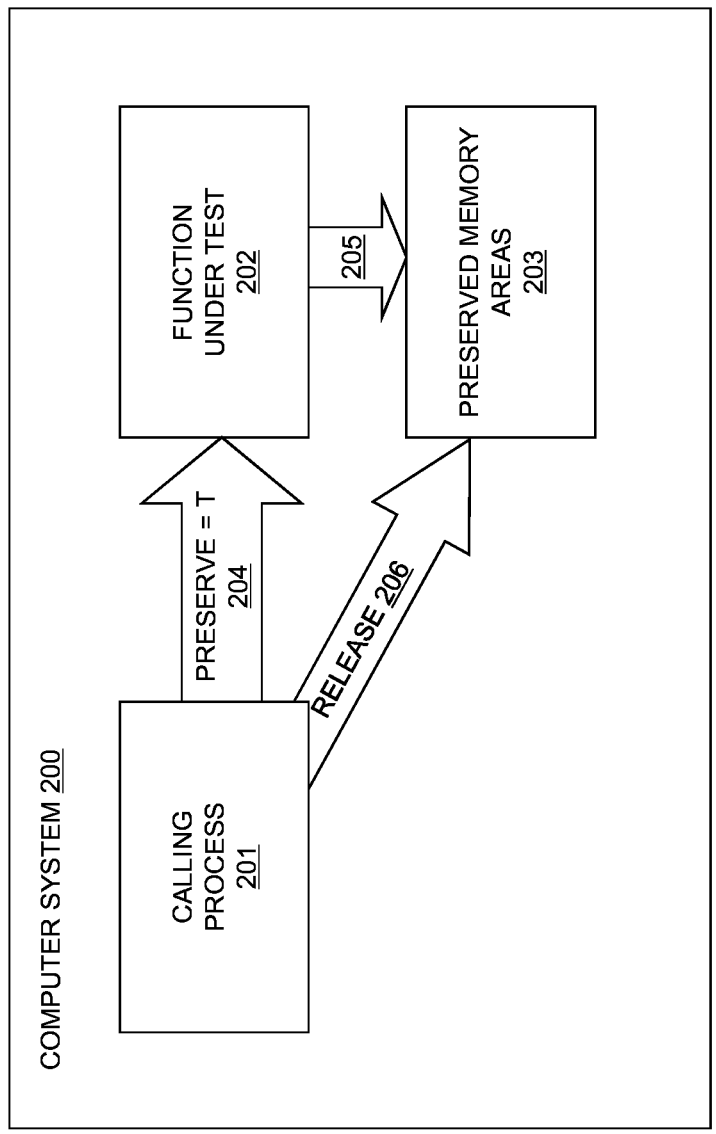
FIG. 2 is a schematic block diagram illustrating an embodiment of a computing system for testing including a preserve status parameter.

FIG. 2 shows an embodiment of a computing system 200 including a preserve status parameter for testing that implements method 100 of FIG. 1. A calling process 201 in the computer system 200 calls a function under test 202; the call 204 from the calling process 201 to the function under test 202 sets the preserve status parameter to, for example, '1', "true", or "yes" in various embodiments. The function under test 202 then executes. During execution of the function under test 202, data 205 generated by function under test 202 is stored in preserved memory areas 203. Because the preserve status parameter was set in call 204, the data in memory areas 203 is preserved during and after completion of the execution of function under test 202. The preserved memory areas 203 may include any of, but are not limited to, a control block, an internal request element, table information, a buffer, a buffer control block, a work unit block, a placeholder, and metadata. In the event of an error in execution of function under test 202, the data in preserved memory areas 203 may then be made available for inspection after completion of execution of function under test 202 by, for example, performing a dump or state save of the preserved memory areas 203. After the data in memory areas 203 has been made available for inspection, or if no error occurred during the execution of function under test 202, the preserved memory areas 203 may then be released for reuse by computing system 200 by a release command 206 from calling process 201.

In one example, the calling process 201 may comprise a database management system, and the function under test 202 may comprise an access method. The database management system sets the preserve status parameter to save access method control blocks that are accessed by the access method during execution. The database management system then determines whether the execution was successful. If successful, the database management system calls the access method again to explicitly release the control blocks. If an error is detected, the database management system requests a dump that includes the preserved control blocks. In another example, the calling process 201 may comprise outboard policy management, and the function under test 202 may comprise hardware of the computing system 200 that is managed by the outboard policy management. The outboard policy management may trigger setting the preserve status parameter, applying a sandbox or setting a bit passed during processing. The machine code on the hardware may access memory areas holding information such as metadata and table information during processing, and these memory areas are preserved by setting of the preserve status parameter.

Tables 1-4 below show various implementations of code segments that include setting and releasing of a preserve status parameter, such as was described above with respect to FIGS. 1 and 2. Table 1 is in pseudocode, Table 2 is in assembly, Table 3 is a shell script, and Table 4 is in job control language (JCL). Tables 1-4 are shown for illustrative purposes only; a preserve status parameter for testing in a computer system may be implemented in any appropriate manner, in any appropriate computer language.

TABLE 1

Psuedocode Segment Example including Preserve Status Parameter

| | |
|---|---|
| Calling function: | |
| 1 | <Doing things> |
| 2 | preserve_status_from_call = true |
| 3 | returned_data = called_function(<data>, preserve_status_from_call) |
| 4 | <check returned_data> |
| 5 | if returned_data_is_valid then |
| 6 |     call called_function(release_status_data) |

TABLE 1-continued

Psuedocode Segment Example including Preserve Status Parameter

| | |
|---|---|
| 7 | <Doing other things> |
| Called Function, first entry point: | |
| 8 | called_function(<data>, save_state): |
| 9 | release_status() |
| 10 | <Doing things> |
| 11 | if save_state != TRUE then |
| 12 |     free(saved_data) |
| 13 | else |
| 14 |     preserve_status(saved_data) |
| 15 | return(processed_data) |
| Called function, second entry point: | |
| 16 | called_function(release_status_data) |
| 17 | release_status() |
| 18 | return(true) |

TABLE 2

Assembly Segment Example including Preserve Status Parameter

Lines 1-45 define the data area in calling program that is passed to called program:

| | | | | |
|---|---|---|---|---|
| 1 | GETRPL | DS | 0X | VSAM REQUEST PARAMETER LIST |
| 2 | RPLID | DS | XL1 | CONTROL BLOCK IDENTIFIER |
| 3 | RPLSTYP | DS | XL1 | RPL SUBTYPE |
| 4 | RPLREQ | DS | XL1 | REQUEST TYPE |
| 5 | RPLLNG | DS | XL1 | LENGTH OF THE RPL |
| 6 | RPLPLHPT | DS | XL4 | ADDRESS OF THE PLH |
| 7 | RPLECB | DS | XL4 | INTERNAL ECB OR ADDRESS OF THE EXTERNAL ECB |
| 8 | RPLFDBK | DS | 0XL4 | FEEDBACK CODE |
| 9 | RPLFUNCD | DS | XL1 | PROBLEM DETERMINATION FUNCTION |
| 10 | RPLRTNCD | DS | XL1 | RPL RETURN CODE |
| 11 | RPLCMPON | DS | XL1 | COMPONENT ISSUING THE CODE |
| 13 | RPLERRCD | DS | XL1 | ERROR CODE |
| 14 | RPLKEYL | DS | XL2 | KEY LENGTH |
| 15 | RPLSTRID | DS | XL2 | RPL STRING IDENTIFIER |
| 16 | RPLCCHAR | DS | XL4 | ADDRESS OF THE CONTROL CHARACTER |
| 17 | RPLDACB | DS | XL4 | ADDRESS OF THE CALLER'S ACB |
| 18 | RPLTCBPT | DS | XL4 | ADDRESS OF THE USER'S TCB |
| 19 | RPLAREA | DS | XL4 | ADDRESS OF THE CALLER'S RECORD AREA |
| 20 | RPLARG | DS | XL4 | ADDRESS OF THE CALLER'S SEARCH ARGUMENT |
| 21 | RPLOPT1 | DS | XL1 | OPTION FLAG BYTE 1 |
| 22 | RPLLOC | EQU | X'80' | LOCATE MODE |
| 23 | RPLDIR | EQU | X'40' | DIRECT-SEARCH ACCESS |
| 24 | RPLSEQ | EQU | X'20' | SEQUENTIAL ACCESS |
| 25 | RPLSKP | EQU | X'10' | SKIP SEQUENTIAL PROCESSING |
| 26 | RPLASY | EQU | X'08' | ASYNCHRONOUS REQUEST |
| 27 | RPLKGE | EQU | X'04' | SEARCHKEY GREATER THAN OR EQUAL |
| 28 | RPLGEN | EQU | X'02' | GENERIC KEY |
| 29 | RPLECBSW | EQU | X'01' | EXTERNAL ECB |
| 30 | RPLOPT2 | DS | XL1 | OPTION FLAG BYTE 2 |
| 31 | RPLKEY | EQU | X'80' | LOCATE RECORD BY KEY |
| 32 | RPLADR | EQU | X'40' | LOCATE RECORD BY RBA |
| 33 | RPLADD | EQU | X'40' | LOCATE RECORD BY RBA |
| 34 | RPLCNV | EQU | X'20' | LOCATE CONTROL INTERVAL BY RBA |
| 35 | RPLBWD | EQU | X'10' | PROCESS IN BACKWARD DIRECTION |
| 36 | RPLLRD | EQU | X'08' | LOCATE OR RETRIEVE LAST RECORD IN DATA SET |
| 37 | RPLWAITX | EQU | X'04' | SYNCHRONOUS PROCESSING WAIT EXIT |
| 38 | RPLUPD | EQU | X'02' | UPDATE PROCESSING |
| 39 | RPLNSP | EQU | X'01' | NOTE THE STRING POSITION |
| 40 | RPLOPT3 | DS | XL1 | OPTION BYTE 3 |
| 41 | RPLTSAVE | EQU | X'80' | TEMPORARILY SAVE DIAGNOSTIC DATA |
| 42 | RPLCSAVE | EQU | X'40' | CANCEL PREVIOUS TEMPORARY SAVE REQUEST |
| 43 | RPLRDCR | EQU | X'20' | RLS CONSISTENT READ |
| 44 | RPLRDCRE | EQU | X'10' | RLS CONSISTENT READ EXPLICIT |
| 45 | RPLOPT4 | DS | XL1 | OPTION BYTE 4 |

Lines 46-47 show the call example with the preserve status parameter turned on:

| | | | |
|---|---|---|---|
| 46 | OI | RPLOPT3,RPLTSAVE | TURN ON TEMPORARY SAVING FLAG |
| 47 | GET | RPL=GETRPL | CALL VSAM TO RETRIEVE USER DATA AND SAVE DIAGNOSTIC DATA |

Lines 48-50 verify that the request is satisfactory or collect problem documentation if unsatisfactory:

| | | | |
|---|---|---|---|
| 48 | NI | RPLOPT3, X'FF'-RPLTSAVE | //TURN OFF TEMPORARY SAVING FLAG |
| 49 | OI | RPLOPT3, RPLCSAVE | //TURN ON CANCEL TEMPORARY SAVING FLAG |
| 50 | GET | RPL=GETRPL | //CALL TO CANCEL TEMPORARY SAVING |

TABLE 3

Shell Script Example including Preserve Status Parameter

| | |
|---|---|
| 1 | #!/bin/sh |
| Lines 2-3 are the function call with preserve status on: | |
| 2 | export_preserve_status=1 |
| 3 | function_call parm_1 parm_2 |
| Lines 4-5 verify that the request is satisfactory or collect problem documentation if unsatisfactory: | |
| 4 | export_release_status=1 |
| 5 | function_call parm_1 parm_2 |

TABLE 4

JCL Segment Example Including Preserve Status Parameter

| | |
|---|---|
| Lines 1-2 invoke JCL snippet: | |
| 1 | EXEC PGM=TESTCASE1,REGION=30M, |
| 2 | PARM='POSIX(ON) HEAPP(ON) STO(AA,EE,BB,8K)/1 R30 -sYES' |
| Lines 3-16 are the function call with preserve status on (in this example, preserved areas are released based on a timer, which is not shown): | |
| 3 | Start TESTCASE1 |
| 4 | parse input args: |
| 5 | if (-s = YES) then |
| 6 | SAVEDATA = YES |
| 7 | cntr = 0 |
| 8 | For each call, if (SAVEDATA = YES) |
| 9 | create testcase1_savearea(cntr) |
| 10 | Issue call |
| 11 | if (call return_value != 0) |
| 12 | call routine to save diagnostic data in testcase1_savearea(cntr) |
| 13 | increment counter |
| 14 | Issue message: saved data in testcase1_savearea(0) – |
| 15 | testcase1_savearea(cntr−1) |
| 16 | End TESTCASE1 |

Figure 3:
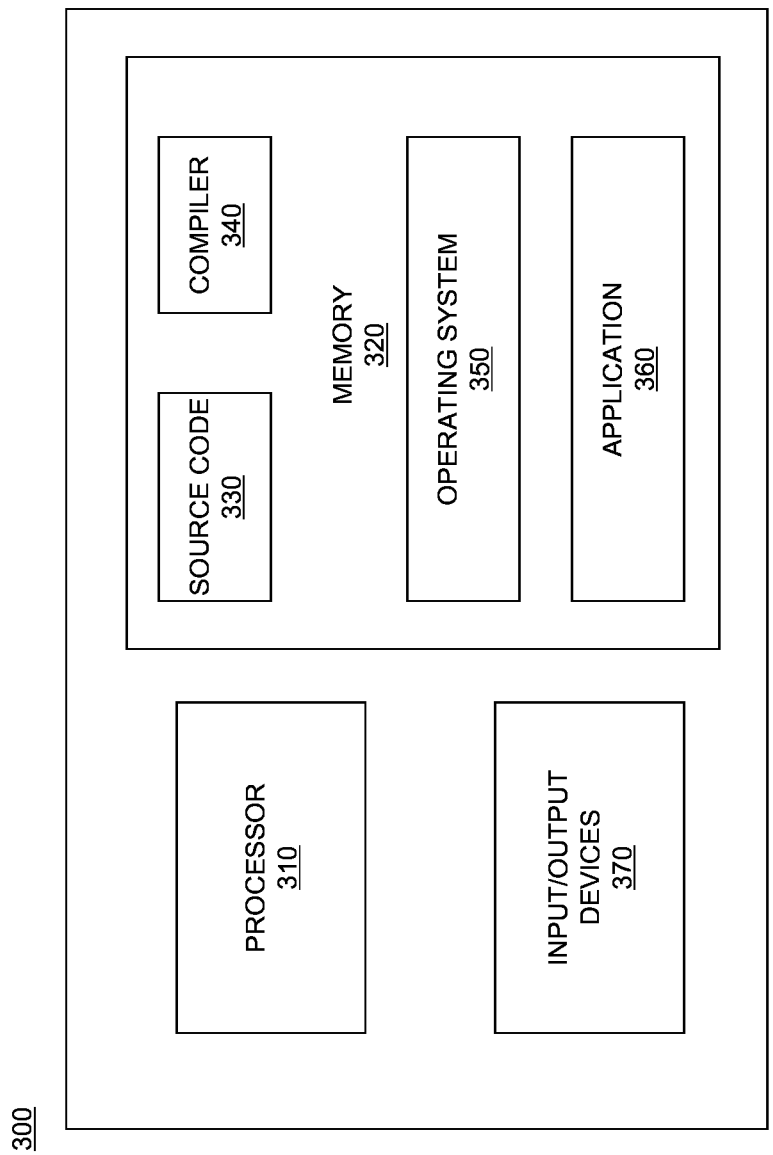
FIG. 3 is a schematic block diagram of an embodiment of a computer that may be used in conjunction with testing in a computing system including a preserve status parameter.

FIG. 3 illustrates an example of a computer 300 which may be utilized by exemplary embodiments of a method for testing in a computing system including a preserve status parameter as embodied in software. For example, the calling process 201 and function under test 202 of FIG. 2 may comprise an application 360, and the preserved memory areas 203 of FIG. 2 may be located anywhere in memory 320. Various operations discussed above may utilize the capabilities of the computer 300. One or more of the capabilities of the computer 300 may be incorporated in any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include preservation of data that may be used to diagnose and fix errors in a computing system.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for testing using a preserve status parameter in a computing system, the method comprising:
    setting, by a calling process in the computing system, the preserve status parameter, wherein setting the preserve status parameter is performed in the call to the function under test by the calling process;
    issuing a call to a function under test by the calling process in the computing system;
    executing the function under test in the computing system, wherein data in a memory area accessed by the function under test during execution is preserved based on the preserve status parameter, such that the computing system does not reuse the memory area while the data in the memory area is being preserved;
    determining if an error occurred during execution of the function under test;
    in the event an error is determined to have occurred during execution of the function under test, making the data in the memory area available for inspection; and
    releasing the memory area for reuse by the computing system.

2. The method of claim 1, wherein setting the preserve status parameter comprises specifying a particular memory area in the computing system to be preserved.

3. The method of claim 1, wherein the memory area comprises one of a control block, an internal request element, table information, a buffer, a buffer control block, a work unit block, a placeholder, and metadata.

4. The method of claim 1, wherein making the data in the memory area available for inspection comprises performing one of a dump and a state save.

5. The method of claim 1, wherein releasing the memory area comprises issuing a second call to the function under test by the calling process.

6. The method of claim 1, wherein releasing the memory area is performed based on a timer.

7. The method of claim 6, wherein the timer comprises a cleanup sequence that is performed with a set periodicity, such that a preserved memory area that is determined to have been preserved for longer than a threshold preservation time is automatically released by the cleanup sequence.

8. The method of claim 1, wherein releasing the memory area is performed based on a shortage of memory in the computing system.

9. The method of claim 1, wherein the calling process comprises a first software module, and the function under test comprises a second software module.

10. The method of claim 1, wherein the calling process comprises a computer hardware management module, and the function under test comprises a function of a piece of computer hardware managed by the computer hardware management module.

11. A computer program product comprising a non-transitory computer readable storage medium containing computer code that, when executed by a computing system, implements a method for testing using a preserve status parameter, wherein the method comprises:

setting, by a calling process in the computing system, the preserve status parameter, wherein setting the preserve status parameter is performed in the call to the function under test by the calling process;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system.

12. The computer program product according to claim 11, wherein setting the preserve status parameter comprises specifying a particular memory area in the computing system to be preserved.

13. The computer program product according to claim 11, wherein the memory area comprises one of a control block, an internal request element, table information, a buffer, a buffer control block, a work unit block, a placeholder, and metadata.

14. The computer program product according to claim 11, wherein making the data in the memory area available for inspection comprises performing one of a dump and a state save.

15. The computer program product according to claim 11, wherein releasing the memory area comprises issuing a second call to the function under test by the calling process.

16. The computer program product according to claim 11, wherein releasing the memory area is performed based on a timer.

17. The computer program product according to claim 16, wherein the timer comprises a cleanup sequence that is performed with a set periodicity, such that a preserved memory area that is determined to have been preserved for longer than a threshold preservation time is automatically released by the cleanup sequence.

18. The computer program product according to claim 11, wherein releasing the memory area is performed based on a shortage of memory in the computing system.

19. A method for testing using a preserve status parameter in a computing system, the method comprising:

setting, by a calling process in the computing system, the preserve status parameter, wherein setting the preserve status parameter comprises specifying a particular memory area in the computing system to be preserved;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system.

20. A method for testing using a preserve status parameter in a computing system, the method comprising:

setting, by a calling process in the computing system, the preserve status parameter;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system, wherein releasing the memory area is performed based on a timer.

21. A method for testing using a preserve status parameter in a computing system, the method comprising:

setting, by a calling process in the computing system, the preserve status parameter;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system, wherein releasing the memory area is performed based on a shortage of memory in the computing system.

22. A method for testing using a preserve status parameter in a computing system, the method comprising:

setting, by a calling process in the computing system, the preserve status parameter;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system;

wherein the calling process comprises a computer hardware management module, and the function under test comprises a function of a piece of computer hardware managed by the computer hardware management module.

23. A computer program product comprising a non-transitory computer readable storage medium containing computer code that, when executed by a computing system, implements a method for testing using a preserve status parameter, wherein the method comprises:

setting, by a calling process in the computing system, the preserve status parameter, wherein setting the preserve status parameter comprises specifying a particular memory area in the computing system to be preserved;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system.

24. A computer program product comprising a non-transitory computer readable storage medium containing computer code that, when executed by a computing system, implements a method for testing using a preserve status parameter, wherein the method comprises:

setting, by a calling process in the computing system, the preserve status parameter;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system, wherein releasing the memory area is performed based on a timer.

25. A computer program product comprising a non-transitory computer readable storage medium containing computer code that, when executed by a computing system, implements a method for testing using a preserve status parameter, wherein the method comprises:

setting, by a calling process in the computing system, the preserve status parameter;

issuing a call to a function under test by the calling process in the computing system;

executing the function under test in the computing system, wherein data in a memory area accessed by the function under test during execution is preserved based on the preserve status parameter, such that the computing system does not reuse the memory area while the data in the memory area is being preserved;

determining if an error occurred during execution of the function under test;

in the event an error is determined to have occurred during execution of the function under test, making the data in the memory area available for inspection; and releasing the memory area for reuse by the computing system, wherein releasing the memory area is performed based on a shortage of memory in the computing system.

* * * * *